US012115698B1

(12) United States Patent
Sandler

(10) Patent No.: US 12,115,698 B1
(45) Date of Patent: Oct. 15, 2024

(54) DRILLING SYSTEM

(71) Applicant: Gregory Ryan Sandler, Sacramento, CA (US)

(72) Inventor: Gregory Ryan Sandler, Sacramento, CA (US)

( * ) Notice: Subject to any disclaimer, the term of this patent is extended or adjusted under 35 U.S.C. 154(b) by 190 days.

(21) Appl. No.: 17/848,278

(22) Filed: Jun. 23, 2022

Related U.S. Application Data

(60) Provisional application No. 63/214,180, filed on Jun. 23, 2021.

(51) Int. Cl.

| | |
|---|---|
| ***B28D 1/14*** | (2006.01) |
| ***B28D 7/02*** | (2006.01) |
| ***E04B 1/48*** | (2006.01) |
| *E01C 11/06* | (2006.01) |

(52) U.S. Cl.
CPC ............... *B28D 1/146* (2013.01); *B28D 7/02* (2013.01); *E01C 11/06* (2013.01); *E04B 1/483* (2013.01)

(58) Field of Classification Search
None
See application file for complete search history.

(56) References Cited

U.S. PATENT DOCUMENTS

| | | | | |
|---|---|---|---|---|
| 2002/0148651 A1* | 10/2002 | DeBlasio | ................. | B28D 7/02 175/65 |
| 2010/0215449 A1* | 8/2010 | Kern | ..................... | B23B 39/161 408/1 R |
| 2011/0222977 A1* | 9/2011 | Bando | ..................... | B23B 35/00 408/76 |
| 2017/0051522 A1* | 2/2017 | Velazquez | ............... | E04F 21/00 |

FOREIGN PATENT DOCUMENTS

| | | |
|---|---|---|
| CN | 108839265 A | * 11/2018 |
| CN | 111976021 A | * 11/2020 |

* cited by examiner

*Primary Examiner* — Tanzim Imam
(74) *Attorney, Agent, or Firm* — Plager Schack LLP; Mark H. Plager, Esq.; Naomi Mann, Esq.

(57) ABSTRACT

A core drill method and system comprise simultaneously drilling multiple holes horizontally into a concrete slab and using wet core drilling to create a concrete slurry that contains dust produced by drilling.

9 Claims, 4 Drawing Sheets

DRILLING SYSTEM

RELATED APPLICATION

This application claims benefit to U.S. Provisional Application No. 63/214,180 filed Jun. 23, 2021, which is incorporated by reference herein in its entirety.

BACKGROUND

The present invention generally relates to drilling systems.

In the concrete industry, a standard process to join two slabs of concrete together may comprise percussion drilling holes horizontally on the slab, then inserting dowel pin(s) and pouring the next slab over the dowel pin(s). The process of percussion drilling (also known as hammer drilling) may cause micro fractures and spalling in the concrete slab, which overtime may lead to catastrophic failure of the slab. As such, slabs may have to be replaced frequently at a substantial cost. Additionally, such drilling may launch crystalline silica dust into the air, which may cause health hazards to persons in the vicinity, including lung damage, and silicosis. As such, there is a need for an improved drilling system that prevent micro fractures/spalling of the concrete slabs and reduces hazardous dust particles.

SUMMARY

The disclosed subject matter provides a drilling system including a core drill machine that simultaneously drills multiple holes horizontally into a concrete slab to reduce or prevent micro fractures and spalling in the slab. In embodiments, the disclosed system may further use wet core drilling to create a containable concrete slurry, rather than dry crystalline silica dust for trapping crystalline silica dust in the liquid/slurry.

In embodiments, the core drilling machine may comprise multiple drill motor assemblies; and a support frame configured to support each of the drill motor assemblies in parallel alignment to one another, such that the drill motor assemblies may be used to drill parallel holes within a concrete slab. In further embodiments, a track support block may be supported vertically below the support frame, wherein the multiple drill motor assemblies are coupled to the track support block longitudinally spaced apart from one another, and wherein the alignment of each of the multiple drill motor assemblies is independently position adjustable on the track support block. In certain embodiments, a position of the track support block is movable in a vertical and/or lateral direction with respect to the support frame. In some embodiments, a hydraulic system is configured to move the track support block. In further embodiments, the machine may include curb guide wheels coupled to the support frame and located below the support frame, wherein the curb guide wheels are configured to contact a vertical side wall of the concreate slab, and to allow the drill motor assemblies to roll vertically against the vertical side wall of the concrete slab. In further embodiments, the machine may comprise front wheels and rear wheels which rollably support the support frame, wherein the curb guide wheels are positioned below the front wheels and the rear wheels. In some embodiments, a water tank supported on the support frame is configured to supply water to each of the drill motor assemblies during drilling. In further embodiments, each drill motor assembly includes a bent axis piston motor configured to receive hydraulic fluid from a hydraulic fluid tank supported on the support frame. In some embodiments, each ben axis piston motor is coupled to a moveable pillow block which supports drill head components.

Some benefits/advantages of the disclosed system may include reducing the cost of replacing concrete slabs due to micro fractures and spalling, reducing health risks to cause by breathing duct particles. Additionally, the multiple drill heads for simultaneous drilling on a concrete slab, provide added efficiency and saves time on the job site, which ultimately saves the end user money in hours of labor.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
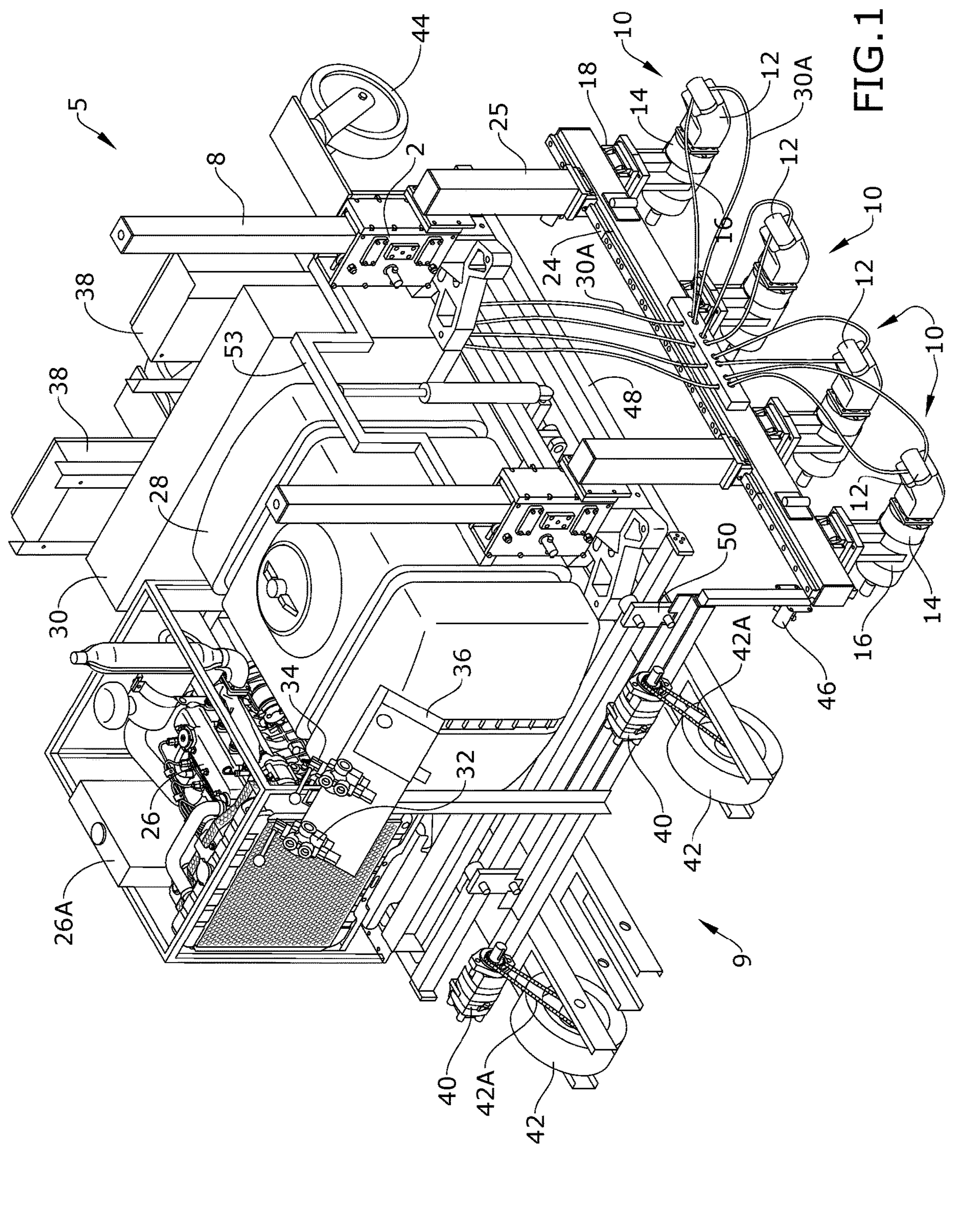
FIG. 1 is a top perspective view of a multiple-core drilling machine, in accordance with various embodiments.

In the following detailed description of the invention, various details, examples, and embodiments of the invention are described. However, it will be clear and apparent to one skilled in the art that the invention is not limited to the embodiments set forth and that the invention can be adapted for any of several applications.

According to various embodiments, disclosed is a drilling system which provides core drill machine 5 for simultaneously drilling multiple holes horizontally into a concrete slab 56. In embodiments, the disclosed machine may use wet core drilling to create a containable concrete slurry, rather than dry crystalline silica dust.

In embodiments as depicted in FIGS. 1-7, core drill machine 5 may generally comprise multiple drill motor assemblies 10, configured to simultaneously drill multiple holes horizontally into concrete slab 56, and may further use wet core drilling. In certain embodiments, multiple drill motor assemblies 10 may be attached to a rolling support frame 9, which may support a system engine 26, a water tank 28 including pump, a hydraulic tank 30, and electrical boxes 38. In further embodiments, core drill machine 5 may include various system control elements which may comprise a control panel 36, and a control valve panel including a first control valve 32 and a second control valve 34 for control hydraulic motors 40 and piston 52 via track steer style control. In some embodiments, a control pendant may further be provided to enable an operator to remotely control core drill machine 5 such that the system may be operated from a safe distance.

In certain embodiments, engine 26 may be a diesel engine, and may include a diesel fuel tank 26A (e.g., of approximate 20-gallon capacity), heat exchanger(s), and fuel cell. Additionally, water tank 28 may include a pump and air compressor. In one embodiment, water tank 28 may be a 100 Gallon tank with 12 Volt pump and 12 Volt air compressor, which may be powered by a 12 Volt battery.

In certain embodiments, the rolling support frame 9 may comprise front wheels 42 and rear wheels 44. In some embodiments, front wheels 42 may include a sprocket and chain 42A which may be coupled to hydraulic motors 40 for rotation of the wheels. Additionally, rear wheels 44 may be configured to swivel. In further embodiments, rolling support frame 9 may also comprise curb guide wheels 46. Curb guide wheels 46 are configured to guide drill motor assemblies 10 against a vertical side wall of concrete slab 56, which may be situated below wheels 42 and 44 and/or support frame 9. Curb guide wheels may further have an axis of rotation perpendicular to that of the drill axis to enable drill motor assemblies to move or roll vertically against the side wall of the concrete slab.

Figure 2:
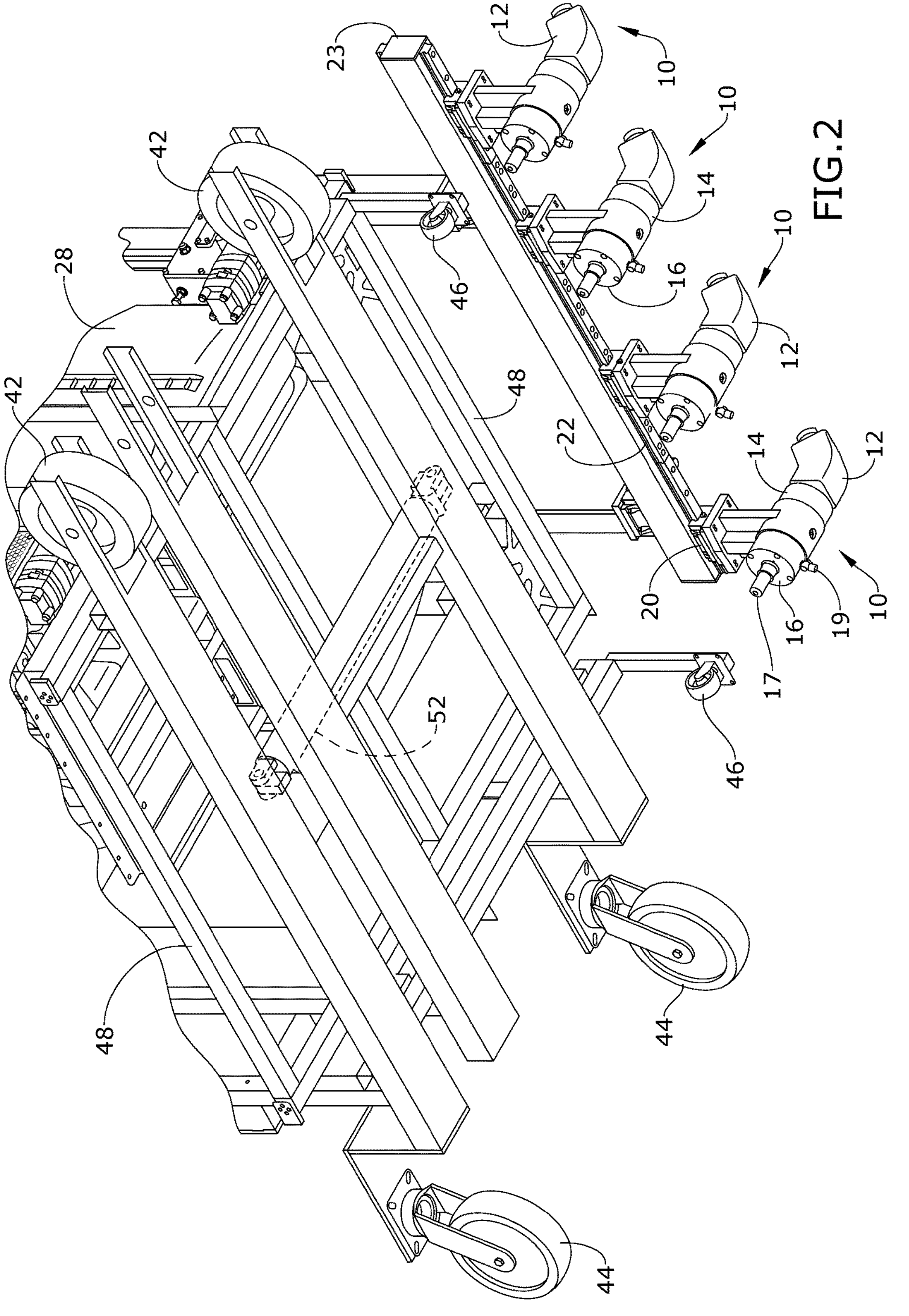
FIG. 2 is a bottom perspective view thereof.
Figure 3:
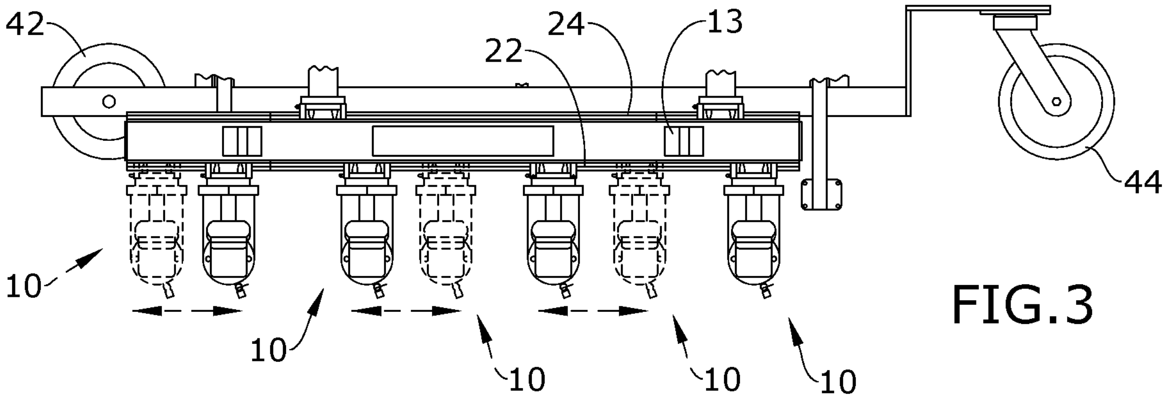
FIG. 3 is a detailed side view, illustrating the adjustable position of drill motor assemblies of the drilling machine.
Figure 4:
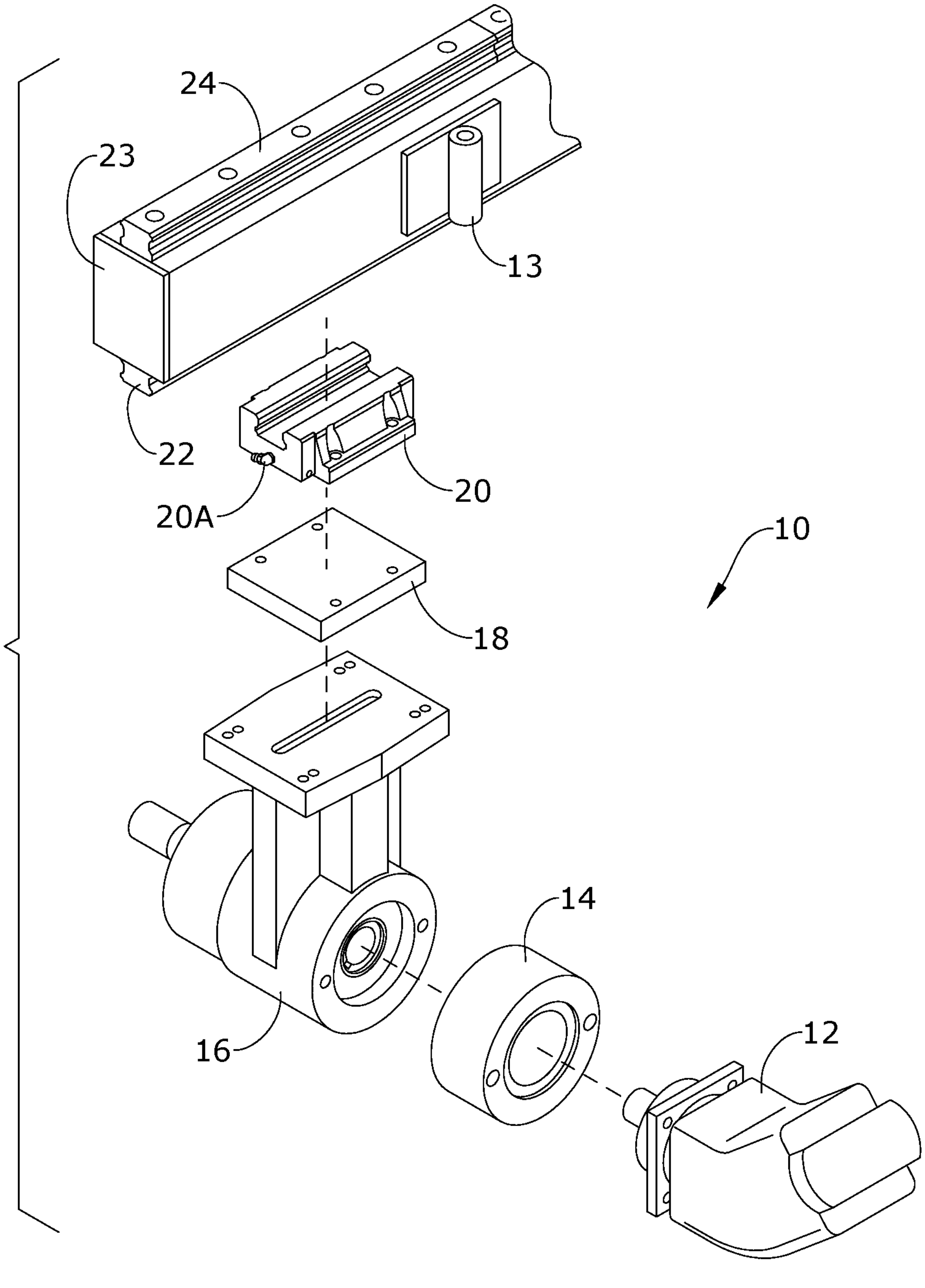
FIG. 4 is an exploded view of one of the drill motor assemblies.
Figure 5:
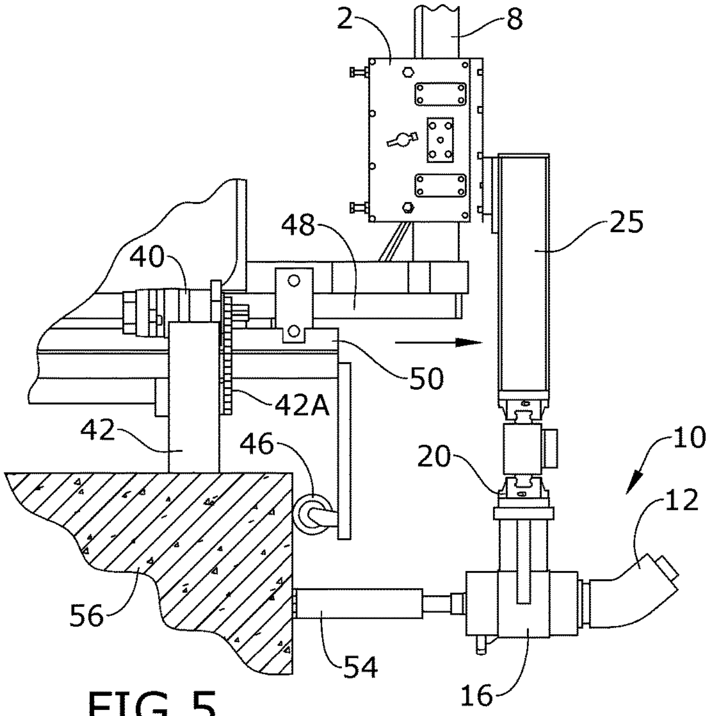
FIG. 5 is a detailed front view, showing the drill motor in an out position.
Figure 6:
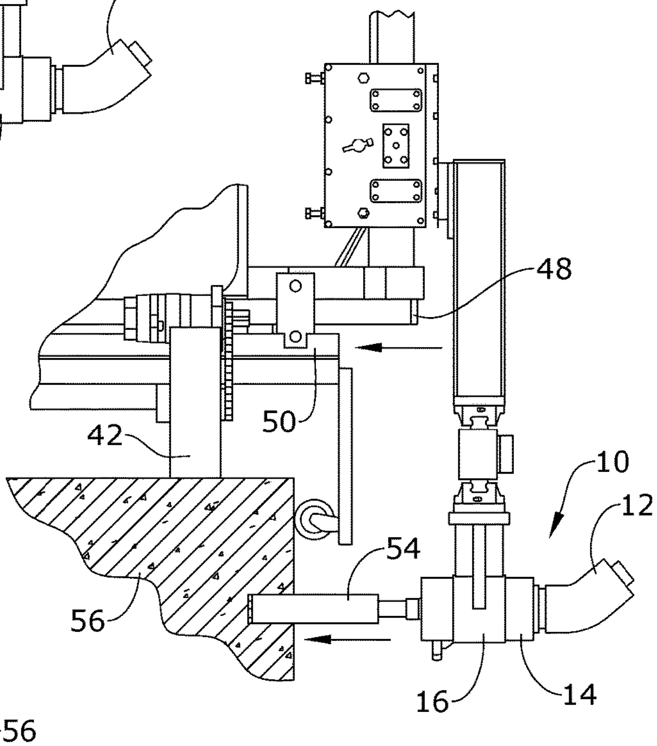
FIG. 6 is a detailed front view, illustrating the drilling of a core.
Figure 7:
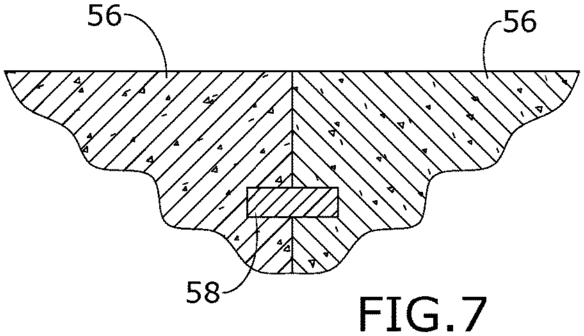
FIG. 7 is a section view of two slabs joined after having been drilled.

In embodiments, rolling support frame 9 may be configured to enable guide drill motor assemblies 10 to move/adjust position in vertical, longitudinal, and/or lateral (i.e., horizontal) directions via a hydraulic system comprising a hydraulic ram and lift bar system 53 hydraulic motors 40, hydraulic tank 30, and hydraulic lines 30A (not shown in FIG. 2 for clarity). In certain embodiments, drill motor assemblies 10 may be movable in a longitudinal direction (i.e., back and forth) via a track system on which drill motor assemblies 10 are supported. In further embodiments, rolling support frame 10 may comprise roller tracks 50 configured to allow movement of guide drill motor assemblies 10 in a lateral direction (i.e., in and out) via piston 52 and hydraulic motors 40. In one embodiment, core drilling machine 5 may comprise two hydraulic motors 40 that use pressurized hydraulic fluid from hydraulic tank 30 to turn a gearbox that propels the in and out motion, wherein each motor 40 may be actuated by one of the control valves 32 and 34, which control the hydraulic feed into motors 40.

Additionally, a roller carriage system may further allow movement of drill motor assemblies 10 in a vertical direction (i.e., up and down). In one embodiment, drill motor assembles 10 may be coupled to a track support block 23, which includes an upper track 24 supported on two or more vertical support posts 25. Vertical support posts 25 may each be coupled to a roller carriage 2 which is configured to move vertically on a vertical column 8. In some embodiments, each vertical column 8 may be supported on positioner frame 48 of support frame 9, wherein roller carriages 2 are moveable laterally via hydraulic ram and lift bar system 53 similar to piston 52. In one embodiment, hydraulic ram and lift bar system 53 includes a hydraulic ram coupled between positioner frame 48 and a lift bar coupled between roller carriages 2 and attached to the hydraulic ram, wherein the hydraulic ram is configured to move up and down with respect to positioner frame 48 via control panel 36 which controls the hydraulic feed into the hydraulic ram.

In certain embodiments, core drill machine 5 may comprise four drill motor assemblies 10 but is not limited to this option. Each of drill motor assemblies may be supported on track support block 23, wherein the track support block extends longitudinally, and is configured to support each of the drill motor assemblies in parallel alignment to one another and longitudinally spaced apart, such that the drill motor assemblies 10 may be used to drill parallel holes within slab 56.

In one embodiment, each of drill motor assemblies 10 may include a bent axis piston motor 12 which may be high speed hydraulic motors configured to receive hydraulic fluid from tank 30 vial lines 30A. The bent axis piston motors 12 may each be coupled to a moveable pillow block 16 via a pillow block to motor adaptor 14. Pillow block 16 may support drill head components including drill bit connector 17 configured to connect to a drill bit 54, and air/water valve 19. Each movable pillow bock 16 may be coupled to a pillow block track plate 20 via a pillow block top plate 18. Pillow block track plate 20 may be longitudinally and manually moveable on a lower track 22 of a track support block 23 to enable precise position adjustment of each assembly 10, wherein two thumb screws 20A, may be used to lock each assembly in position. In embodiments, track support block 23 may further include hinge components 13 configured to allow the end assemblies 10 to swivel out 180 degrees, so that less than all four motors may be used in operation. This enables one or more holes to be drilled in unison into the concrete slab.

In embodiments, valve 19 may be a cock valve which is connected to water tank 28 via a hose and allows water to flow through drill bit connector 17 during drilling. In certain embodiments, the spinning force of the drill system may create a pressure that causes water to be pulled from the tank into connector 17. In some embodiments, drill bits 54 used in the drilling operation may be made out of diamond.

In use, drill bit 54 coupled to drill bit connector of one of the drill motor assemblies may be used to drill into concrete slab 56, wherein the drill machine may be driven across the edge of a concrete slab, using wheels 42 and 44, and curb guide wheels 46 to maintain the drill heads in perpendicular (90 degrees) alignment with the concrete drilling surface and plumb. Additionally, pistons 52 and hydraulic motors 40 may move the drill bit deeper into the slab. Furthermore, the drilling may be one directional and use water that reduces micro cracking and silica dust as opposed to existing percussion drilling techniques.

In some embodiments, as shown in the figures, a dowel or connector rod 58 may be used to connect two slabs 56 which have been precisely cored. This prevents the slabs from shifting when being driven over by aircraft and/or other vehicles. In one embodiment, connector rod 58 may be an epoxy steel rod.

In certain embodiments, electrical boxes 38 may provide a control system which includes hardware and programmed software to automate the drilling process. A drill operator may use control panel 36 and/or an operator pendant to control the water pump, set the desired speed(s) of drilling rotations per minute (RPMs) and feeds (surface inches drilled per minute) for the machine. In some embodiments, the feed pressure may be programmed to automatically reduce if a core bit begins to stall (reduction in RPMs), allowing the core bit to resume optimal speed. The software of electrical boxes 38/control system may further control water flow for creating the concrete slurry at the drilling surface (to contain the hazardous crystalline silica dust).

In some embodiments, the disclose system may comprise various safety features, which may be controlled via the software/hardware system of electrical boxes 38/control system. For example, the hydraulic drive motors 40 may be programmed to disengage and lock when the hydraulic motors 12 are activated and the machine is drilling to prevent the drill machine from moving along the drilling surface.

In certain embodiments, core drilling machine 5 may be operated on a slab in the field/job site, without additional power sources, such as electrical generators, air compressors, etc. In some alternate embodiments, an electric generator, pneumatic compressor, or other power sources may be used to power the core drill(s) rather than hydraulics.

In embodiments, a core drilling method, according to the invention may comprise starting with a grinding process, to simultaneously drill multiple holes horizontally into a concrete slab using wet core drilling. This produces a flat surface around the drilled hole(s). The method may further comprise setting a dowel pin in the hole, with epoxy, and then pouring the next slab around the protruding dowel pin. The grinding process reduces spalling (i.e., chipping or breaking away of the concrete around the hole) and micro fractures in the concrete in comparison to percussion drilling. Additionally, multiple drills may be used in unison to smoothly and simultaneously core perfectly aligned holes through the concreate slab, while the operator may stand on top of the slab to drill into its vertical side.

The disclosed subject matter provides a drill machine that may simultaneously drill one or more holes horizontally into a concrete slab and use wet core drilling to create a containable concrete slurry. The disclosed machine and system may be used for any roadway, airport runways or bridge connections that requires coring and setting a dowel pin with epoxy and then pouring the next slab around the protruding dowel pin but may be used with any drilling projects and in various industries. The disclosed drilling machine may be designed with any number of hydraulic components, and various power source(s) and/or pump sizes, depending on the desired operational parameters, drilling project, etc. Although the core drill machine and system has been explained in relation to its preferred embodiment, it is to be understood that many other possible modifications and variations can be made without departing from the spirit and scope of the invention.

The present invention may reduce crystalline silica dust, micro fractures, and spalling created by percussion or hammer drilling. In embodiments, the disclosed system provides a drilling machine which uses water to capture the dust and turn it into a slurry that is containable and may reduce airborne contaminants by at least 95%. Additionally, testing of the disclosed core drill machine/system showed a reduction of a reduction in micro fractures and spalling by approximately 95%.

It shall be appreciated that the disclosed system can have multiple configurations in different embodiments. In some embodiments, one drilling assembly may be used. In other embodiments, any number of drilling assemblies may be used.

It shall be appreciated that the components of the disclosed system may comprise any alternative materials and be of any size and/or dimensions. It shall further be appreciated that the components of the disclosed system may be manufactured and assembled using any known techniques in the field.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A core drill machine, comprising:

multiple drill motor assemblies;

a support frame configured to support each of the drill motor assemblies in parallel alignment to one another, such that the drill motor assemblies can be used to drill parallel holes within a concrete slab;

a track support block which is supported vertically below the support frame, wherein the multiple drill motor assemblies are coupled to the track support block longitudinally spaced apart from one another, wherein each of the multiple drill motor assemblies is independently position adjustable on the track support block, wherein a position of the track support block is movable in a vertical direction and/or a lateral direction with respect to the support frame, the core drill machine further comprising curb guide wheels coupled to the support frame and located below the support frame, wherein the curb guide wheels are configured to contact a vertical side wall of the concrete slab and to align a drill axis of the drill motor assemblies perpendicularly to the vertical side wall.

2. The core drill machine of claim 1, further comprising front wheels and rear wheels which rollably support the support frame, wherein the curb guide wheels are positioned below the front wheels and the rear wheels.

3. The core drill machine of claim 1, further comprising a water tank supported on the support frame and configured to supply water to each of the drill motor assemblies during drilling.

4. A core drill machine, comprising:

multiple drill motor assemblies; and a support frame configured to support each of the drill motor assemblies in parallel alignment to one another, such that the drill motor assemblies can be used to drill parallel holes within a concrete slab, wherein each drill motor assembly includes a bent axis piston motor configured to receive hydraulic fluid from a hydraulic fluid tank supported on the support frame.

5. The core drill machine of claim 4, wherein each bent axis piston motor is coupled to a movable pillow block which supports drill head components.

6. The core drill machine of claim 4, further comprising a track support block which is supported vertically below the support frame, wherein the multiple drill motor assemblies are coupled to the track support block longitudinally spaced apart from one another, and wherein each of the multiple drill motor assemblies is independently position adjustable on the track support block.

7. The core drill machine of claim 6, wherein a position of the track support block is movable in a vertical direction and/or a lateral direction with respect to the support frame.

8. The core drill machine of claim 7, further comprising a hydraulic system configured to move the track support block in said vertical direction and/or said lateral direction.

9. A core drill machine, comprising:

multiple drill motor assemblies;

a support frame configured to support each of the drill motor assemblies in parallel alignment to one another, such that the drill motor assemblies can be used to drill parallel holes within a concrete slab, the core drill machine further comprising an engine, a water tank, a hydraulic tank, electrical components, and control components supported on the support frame.

* * * * *